United States Patent
Fujita (10) Patent No.: US 8,546,743 B2
(45) Date of Patent: Oct. 1, 2013

(54) ENCODER IN WHICH THE RELATIVE DISPLACEMENT BETWEEN THE ENCODER SCALE AND ENCODER HEAD IS DETECTED

(75) Inventor: Hiromasa Fujita, Hachioji (JP)

(73) Assignee: Olympus Corporation, Tokyo (JP)

( * ) Notice: Subject to any disclaimer, the term of this patent is extended or adjusted under 35 U.S.C. 154(b) by 602 days.

(21) Appl. No.: 12/568,866

(22) Filed: Sep. 29, 2009

(65) Prior Publication Data

US 2010/0078548 A1    Apr. 1, 2010

(30) Foreign Application Priority Data

Sep. 30, 2008   (JP) ................................. 2008-254727

(51) Int. Cl.
   *G01D 5/34* (2006.01)
(52) U.S. Cl.
   USPC ............ 250/231.13; 250/231.14; 250/231.15; 250/231.16; 250/231.17; 250/231.18; 341/6; 341/13; 341/190
(58) Field of Classification Search
   USPC ...................... 250/231.13–231.18; 341/6, 13, 341/190
   See application file for complete search history.

(56) References Cited

U.S. PATENT DOCUMENTS

| | | | | |
|---|---|---|---|---|
| 4,796,005 A | * | 1/1989 | Ishida et al. ..................... | 341/11 |
| 4,972,080 A | * | 11/1990 | Taniguchi ................. | 250/231.16 |
| 5,127,035 A | * | 6/1992 | Ishii ................................ | 377/24 |
| 2004/0227066 A1 | * | 11/2004 | Huber et al. ............. | 250/231.14 |
| 2004/0262505 A1 | * | 12/2004 | Atsuta et al. ............. | 250/231.13 |
| 2006/0076480 A1 | * | 4/2006 | Kiriyama et al. ........ | 250/231.16 |
| 2007/0018084 A1 | * | 1/2007 | Shimomura et al. ...... | 250/231.13 |
| 2008/0013106 A1 | * | 1/2008 | Sidor et al. .................... | 356/622 |
| 2009/0314930 A1 | * | 12/2009 | Jones et al. .............. | 250/231.13 |

FOREIGN PATENT DOCUMENTS

JP         6-26817        2/1994

* cited by examiner

*Primary Examiner* — Georgia Y Epps
*Assistant Examiner* — Kevin Wyatt
(74) *Attorney, Agent, or Firm* — Scully, Scott, Murphy & Presser, P.C.

(57) ABSTRACT

An encoder detects a relative displacement between an encoder scale and an encoder head. The encoder head incorporates a light source, a light-receiving element to receive light from the light source via the encoder scale, and a signal-processing circuit to process an electrical signal from the light-receiving element. The encoder has a signal detection unit, a signal discrimination unit, and a switching unit. The signal detection unit is activated selectively in accordance with setting. When activated, the signal detection unit detects one or more signals having an almost sinusoidal waveform from the encoder head. The signal discrimination unit is activated selectively in accordance with setting. When activated, the signal discrimination unit determines the waveform of one or more signals having an almost sinusoidal waveform from the signal detection unit. The switching unit switches the current to be supplied to the light source to one of various magnitudes.

14 Claims, 7 Drawing Sheets

ENCODER IN WHICH THE RELATIVE DISPLACEMENT BETWEEN THE ENCODER SCALE AND ENCODER HEAD IS DETECTED

CROSS-REFERENCE TO RELATED APPLICATIONS

This application is based upon and claims the benefit of priority from prior Japanese Patent Application No. 2008-254727, filed Sep. 30, 2008, the entire contents of which are incorporated herein by reference.

BACKGROUND OF THE INVENTION

1. Field of the Invention

The present invention relates to an encoder in which the relative displacement between the encoder scale and the encoder head is detected.

2. Description of the Related Art

Encoders are composed of an encoder scale and an encoder head and are designed to generate periodic signals of different phases in order to detect the relative displacement between the encoder scale and the encoder head. An output of the encoder may be supplied to a data-processing circuit that counts cycles and may therefore be used to detect the moving direction, position, displacement and displacement speed of an object. Such an encoder is disclosed in, for example, Jpn. Pat. Appln. KOKAI Publication No. 6-26817.

Figure 9:
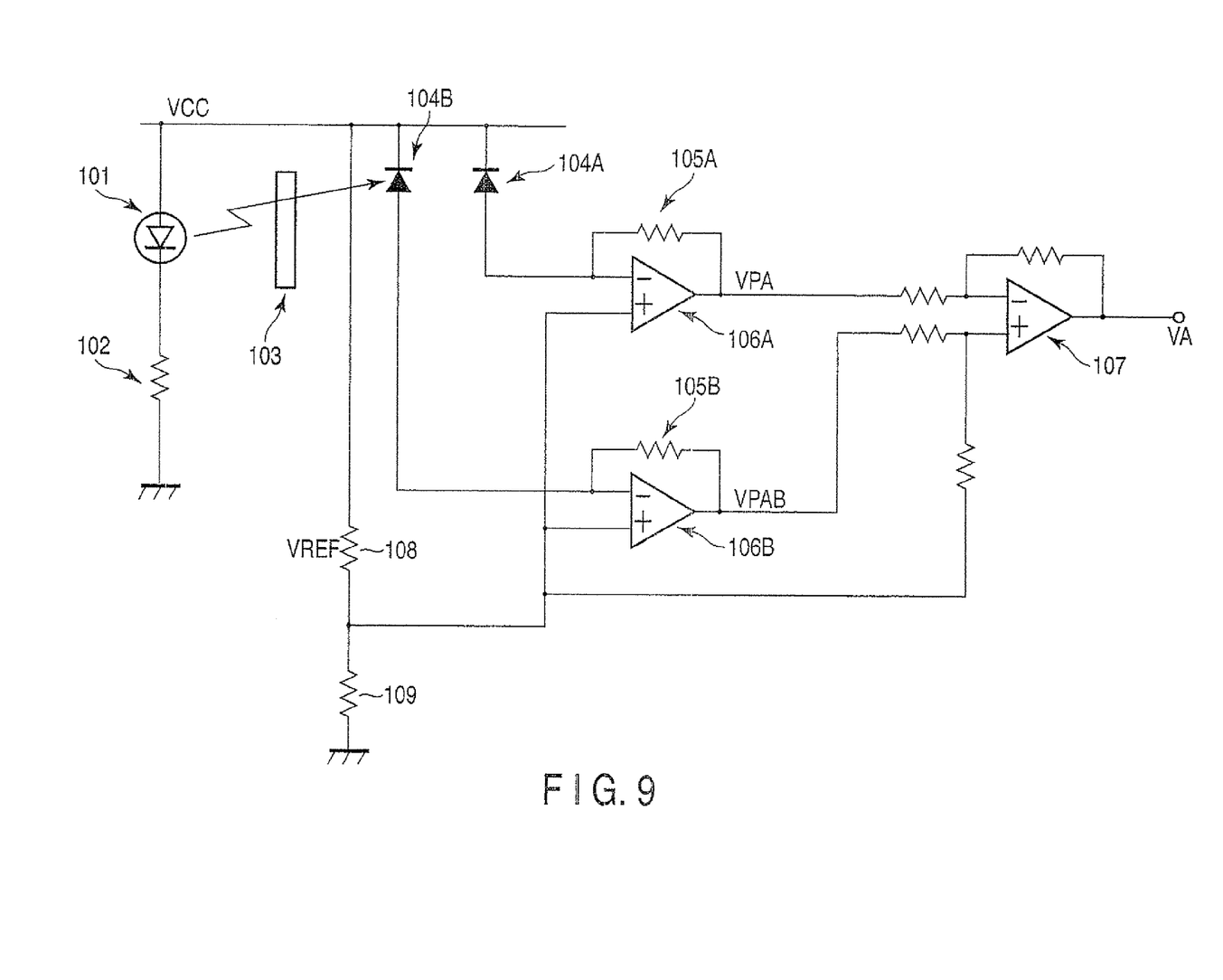
FIG. 9 is diagram showing an exemplary configuration of a conventional encoder.

FIG. 9 shows an exemplary configuration of the conventional encoder. As shown in FIG. 9, a resistor 103 is connected in series with a light source 101 in order to supply a fixed current. The light source 101 emits light, which is applied to a scale 103 that has an optical pattern of a specific periodicity and moves relative to the light source 101. Light passing through the scale 103, light reflected by the scale 103, light diffracted at the scale 103, or light scattered at the scale 103 is applied to light-receiving elements 104A and 104B so that the distance the scale 103 has moved may be detected from the changes in intensity of the light. The light-receiving elements 104A and 104B are arranged such that their output signals may have a phase difference of 180°.

The output of the light-receiving element 104A is connected to a current-to-voltage conversion means composed of a resistor 105A and an operational amplifier 106A. The output of the light-receiving element 104E is connected to a current-to-voltage conversion means composed of a resistor 105B and an operational amplifier 106B. The outputs of this current-to-voltage conversion means are connected to a subtraction means 107. Further, a reference voltage VREF (108) is applied to the operational amplifiers 106A and 106B and used as a reference value for cycle signals.

The photocurrents generated, as electrical signals, by the light-receiving elements 104A and 104B are input to a current-to-voltage conversion means. The current-to-voltage conversion means converts the photocurrents to voltage signals VPA and VPAB, respectively. The voltage signals VPA and VPAB each contain not only an AC component that represents the intensity change of the light reflected by the scale 103, but also a DC component and noise. Note that the DC component pertains to a light component that has a fixed intensity. The subtraction means 107 performs operation of VREF−(VPAB−VPA) in order to remove the DC component and the noise. A cycle signal VA that represents the intensity change only is thereby obtained. The encoder is configured to output several encoder signals such as electrical signals obtained by performing such a process as explained with reference to FIG. 9.

BRIEF SUMMARY OF THE INVENTION

An encoder according to a first aspect of this inv is designed to detect a relative displacement between an encoder scale and an encoder head. The encoder head incorporates a light source, a light-receiving element configured to receive light from the light source via the encoder scale, and a signal-processing unit configured to process an electrical signal output from the light-receiving element. The encoder comprises: a signal detection unit configured to be activated selectively in accordance with setting, and to detect, when activated, one or more electrical signals output from the encoder head; a signal discrimination unit configured to be activated selectively in accordance with setting, and to determine, when activated, a waveform of the encoder signal detected by the signal detection unit; and a switching unit configured to switch a current supplied to the light source to one of various magnitudes in accordance with the waveform determined by the signal discrimination unit.

The encoder according to a second aspect of the invention is one that accords with the encoder according to the first aspect of the invention, wherein the signal detection unit detect the encoder signal output when the encoder scale and the encoder head are displaced relative to each other in an entire region as needed, and the signal discrimination unit determines the waveform the encoder signal detected by the signal detection unit.

The encoder according to a third aspect of the invention is one that accords with the encoder according to the second aspect of the invention, wherein the signal detection unit detects the encoder signal output when the encoder scale and the encoder head are displaced relative to each other in a part of the entire region after the encoder scale and the encoder head have undergone relative displacement in the entire region, and the signal discrimination unit determines the waveform the encoder signal detected by the signal detection unit.

The encoder according to a fourth aspect of this invention is one that accords with the encoder according to the first aspect of the invention, wherein the signal detection unit includes an analog-to-digital converter configured to digitize the encoder signal output from the encoder head and a control unit configured to detect the resulting digital signal.

The encoder according to a fifth aspect of this invention is one that accords with the encoder according to the fourth aspect of the invention, wherein the control unit monitors every cycle of the encoder signal output when the encoder scale and the encoder head undergo relative displacement in the entire region as needed, and detects at least one of the maximum amplitude and minimum amplitude of the encoder signal.

The encoder according to a sixth aspect of this invention is one that accords with the encoder according to the fourth aspect of the invention, wherein the control unit comprises at least one of first and second detection units, the first detection unit being configured to detect the smallest maximum amplitude and the largest minimum amplitude the encoder signal has in each cycle, the encoder signal being output when the encoder scale and the encoder head undergo relative displacement in the entire region as needed, and the second detection unit being configured to detect the smallest minimum amplitude and the largest maximum amplitude the encoder signal has in each cycle.

The encoder according to a seventh aspect of this invention is one that accords with the encoder according to the fourth aspect of the invention, wherein the control unit calculates the amplitude of the encoder signal from a plurality of encoder signals, output when the encoder scale and the encoder head undergo relative displacement in the entire region as needed, by using an equation for obtaining the radius of a circle.

The encoder according to an eighth aspect of this invention is one that accords with the encoder according to the first aspect of the invention, wherein the second detection unit includes a cycle-count detection unit configured to detect the number of cycles of the encoder signal, and a comparator unit configured to compares the number of cycles detected, with the number of cycles of a digital signal produced by digitizing the encoder signal output from the encoder head.

The encoder according to a ninth aspect of this invention is one that accords with the encoder according to the second aspect of the invention, wherein the signal discrimination unit has an alarm generating unit configured to generate an alarm indicating an abnormality when the difference between the maximum amplitude and minimum amplitude that the encoder signal has in each cycle is greater than or equal to a predetermined value, the encoder signal being one detected by the signal detection unit when the encoder scale and the encoder head undergo relative displacement in the entire region as needed.

The encoder according to a tenth aspect of this invention is one that accords with the encoder according to the second aspect of the invention, wherein the signal detection unit comprises a first detection unit configured to detect the smallest maximum amplitude and the largest minimum amplitude the encoder signal has in each cycle, the encoder signal being one detected by the signal detection unit when the encoder scale and the encoder head undergo relative displacement in the entire region as needed, and a second detection unit configured to detect the largest maximum amplitude and the smallest minimum amplitude the encoder signal has in each cycle; and the signal discrimination unit has an alarm generating unit configured to generate an alarm an alarm indicating an abnormality when a difference between first and second differences is greater than or equal to a predetermined value, the first difference being the difference between the smallest and largest amplitudes detected by the first detection unit, and the second difference being the difference between the smallest and largest amplitudes detected by the second detection unit.

The encoder according to an eleventh aspect of this invention is one that accords with the encoder according to the second aspect of the invention, wherein the signal detection unit calculates the amplitude of the encoder signal from a plurality of encoder signals output when the encoder scale and the encoder head undergo relative displacement in the entire region as needed, by using an equation for obtaining the radius of a circle.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of this invention will be outlined first. Each embodiment is an encoder that comprises an encoder scale, an interference light source, and a plurality of light-receiving elements. The encoder scale has a pattern of a specific periodicity. The interference light source applies light to the scale. The light-receiving elements detect the light beam reflected by the scale, the light diffracted at the scale, the light scattered at the scale, and the light passing through the scale. The encoder further comprises a drive unit (switching unit), a signal detection unit, and a signal discrimination unit. The switching unit has the function of switching the current to supply to the light source to one of several magnitudes. The signal detection unit detects the signal output, as an encoder signal, from the encoder head and having an almost sinusoidal waveform. The signal discrimination unit determines the waveform of the signal the signal detection unit has detected.

The signal detection unit is configured to detect an encoder signal output when the encoder scale and the encoder head are displaced relative to each other in an entire region as needed. The signal discrimination unit determines the waveform of the encoder signal the signal detection unit has detected. The switching unit, the signal detection, and the signal discrimination unit are activated selectively at particular intervals and/or at a particular time, either set in the product that uses the encoder. By doing so, the encoder can continue to operate normally, thanks to a stable circuit that has no feedback system involving the encoder signal or the light detected. In addition, the problems, such as the changeover of the circuit or the decrease in the encoder signal amplitude due to a great change in the light of the light source, and the decrease in the encode signal amplitude due to the stain or scars on the scale, can be prevented because signal detection unit and signal discrimination unit keep operating at the particular time set in the product.

The embodiments of the invention will be described in detail, with reference to the accompanying drawings.

First Embodiment

Figure 1:
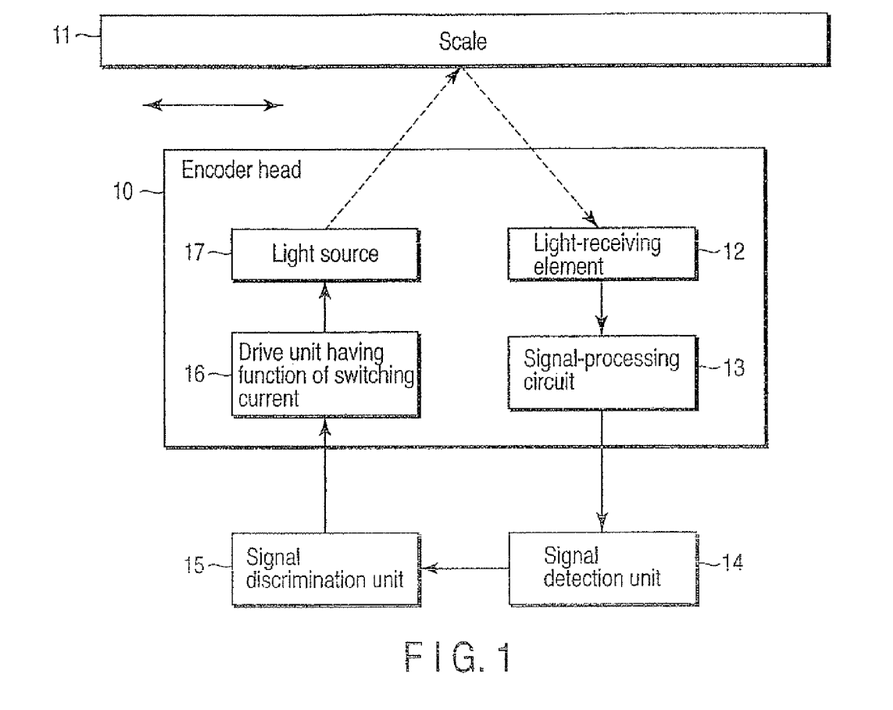
FIG. 1 is a diagram showing the configuration of an encoder according to a first embodiment of this invention.

FIG. 1 is a diagram showing the configuration of an encoder according to a first embodiment of this invention. The encoder comprises mainly of an encoder head 10 and an encoder scale 11. The encoder scale 11 has a pattern of a specific periodicity. The encoder head 10 and the encoder scale 11 may be displaced relative to each other in the directions of arrows. The encoder head 10 incorporates a light-receiving element 12, a signal-processing circuit 13, and a light source 17 (including an interference light source). The light source 17 is driven with the current supplied from a drive unit 16. So driven, the light source 17 emits light. The light first illuminates the encoder scale 11 and then is reflected, diffracted, and scattered. The light reflected is applied back to the encoder head 10.

As the encoder head 10 and the encoder scale 11 undergo relative displacement, the light applied back to the encoder 10 changes. This change in the light is detected by the light-receiving element 12. The light-receiving element 12 generates a current that is proportional to the light the light-receiving element 12 has detected. The current, or an electrical signal that changes as the encoder head 10 and the encoder scale 11 undergo relative displacement, is supplied to the signal-processing circuit 13. The signal-processing circuit 13 processes the signal. More precisely, the circuit 13 converts the current to a voltage, subtracts one signal from another, which differ in phase by 180°, and applies a gain to the resultant difference, generating an encoder signal that has an almost sinusoidal waveform. Thus, the encoder 10 outputs an encoder signal or signals, each representing a phase relationship involving one or more phases.

Thus far described is how the encoder normally operates. This embodiment further comprises a signal detection unit 14 and a signal discrimination unit 15, both arranged outside the encoder head 10. The signal detection unit 14 detects, as an encoder signal, one or more electrical signals output from the encoder head 10. The signal discrimination unit 15 determines the waveform of any encoder signal detected by the signal detection unit 14. Further, in the encoder head 10, the drive unit 16 is connected to the light source 17. The drive unit 16 has the function of switching the current to supply to the light source 17 to one of several magnitudes.

Note that the signal detection unit 14 or the signal discrimination unit 15 need not be actuated along with the operation of the encoder. They are activated selectively. They may effectively operate, for example, if driven when the encoder is installed in a product, when the power switch of the product is turned on, while they remain not operated for a specific period, or when the use-environmental condition, such as temperature, changes. So driven, the signal detection unit 14 and signal discrimination unit 15 would not impart noise to the encoder signal or de-stabilize the encoder signal while the encoder is operating.

Figure 2:
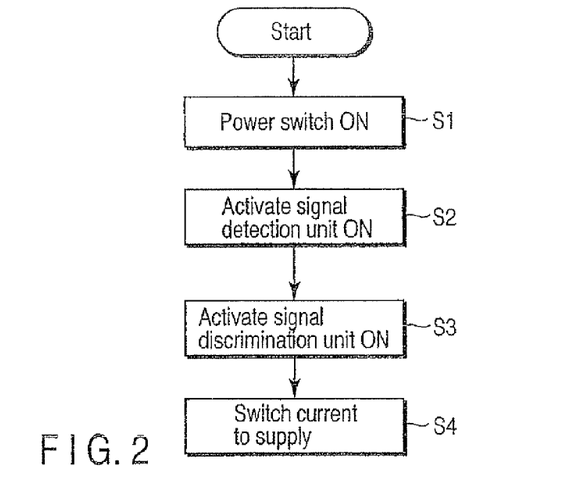
FIG. 2 is a flowchart explaining the sequence of switching the current to supply in the first embodiment of the invention.

FIG. 2 is a flowchart explaining the sequence of switching the current in the first embodiment of the invention. When the power switch of the encoder is turned on (Step 1), the encoder performs an ordinary process of detecting the relative displacement between the encoder head 10 and the encoder scale 11. Next, the signal detection unit 14 and signal discrimination unit 15 are activated in the order they are mentioned (Steps S2 and S3). One or more signals having an almost sinusoidal waveform which is output from the encoder head 10 are input to the signal detection unit 14. The signal detection unit 14 detects the characteristic of the encoder signal detected when the encoder head 10 and scale 11 undergoes relative displacement in an entire region for which at least the encoder signal is utilized and which is a part of the region where the encoder head 10 and scale 11 can undergo relative displacement. The characteristic of the signal, thus detected, is input to the signal discrimination unit 15. The signal discrimination unit 15 determines the current that should be supplied to the light source 17 and informs the drive unit 16 of the magnitude of this current or the operating mode using this current. The drive unit 16, which has the function of switching the current, switching the current to one of various magnitudes, or one of at least two magnitudes, in accordance with the current determined by the signal discrimination unit 15 (Step S4). The current, thus set, is supplied to the light source 17.

Figure 3A:
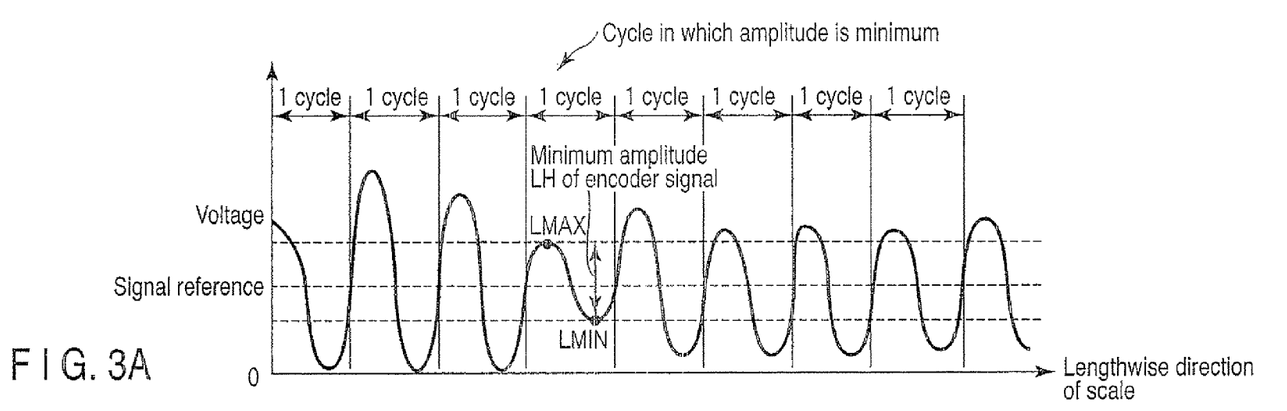
FIGS. 3A and 3B are diagrams showing an exemplary encoder signal for one phase, which is output from an encoder head 10 and input to a signal detection unit 14.
Figure 3B:
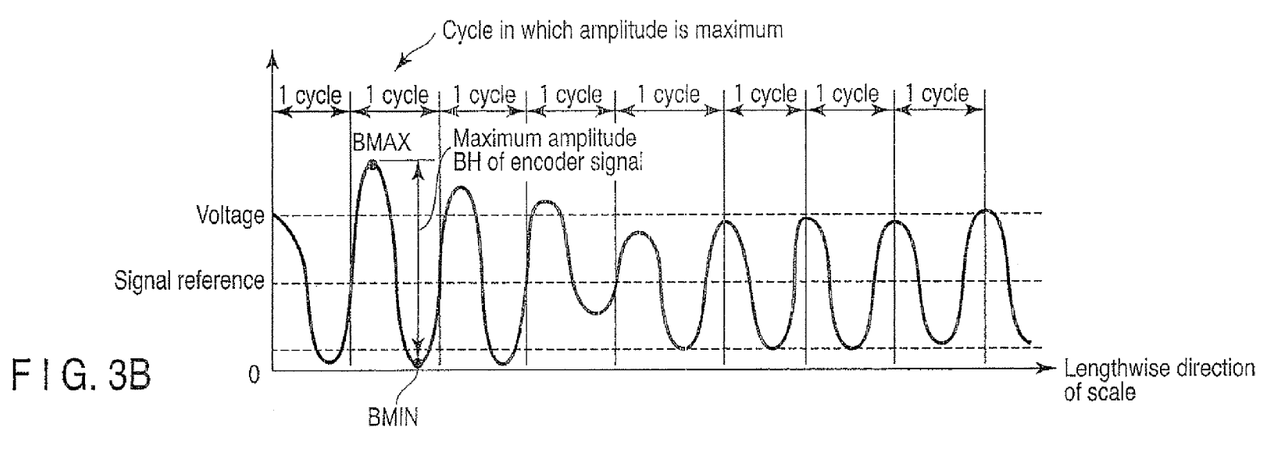

FIGS. 3A and 3B are diagrams showing an exemplary encoder signal for one phase, which is output from an encoder head 10 and input to the signal detection unit 14. The signal detection unit 14 detects the characteristic of the encoder signal. In the case of FIG. 3A, for example, the signal detection unit 14 finds the cycle in which the signal generated from the relative displacement between the encoder 10 and scale 11 has the minimum amplitude. The signal detection unit 14 then detects the maximum LMAX and minimum LMIN the signal has at the cycle and calculates the minimum amplitude of the encoder signal LH (=LMAX−LMIN). In the case of FIG. 35, the signal detection unit 14 finds the cycle at which the signal generated from the relative displacement between the encoder 10 and scale 11 has the maximum amplitude and then detects the maximum BMAX and minimum BMIN the signal has at the cycle and calculates the maximum amplitude of the encoder signal BH (=BMAX−BMIN). Both the minimum amplitude LH and the maximum amplitude BH may be calculated as shown in FIGS. 3A and 3B. Alternatively, only the minimum amplitude LH or the maximum amplitude BH may be calculated.

The signal discrimination unit 15 determines whether the minimum amplitude LH of the encoder signal shown in FIG. 3A is greater than the lower limit used in the apparatus in which the encoder signal is used. This is sufficient in most cases for any apparatus that uses encoder signals in binary form. If necessary, nonetheless, the unit 15 further determines whether the maximum amplitude BH if the encoder signal shown in FIG. 3B has been processed within a processing range of the signal-processing circuit 13 and whether LMAX and LMIN are well sufficient with respect to the signal reference.

The signal discrimination unit 15 further determines whether the encoder signal is abnormal, from the signal characteristic the signal detection unit 14 has detected. If the encoder signal is found to be abnormal, the signal discrimination unit 15 can generate an alarm. For example, if BH-LH is too large, the unit 15 will generate an alarm, showing that the positioning of the encoder head 10 and encoder scale 11 may be inappropriate.

Figure 4:
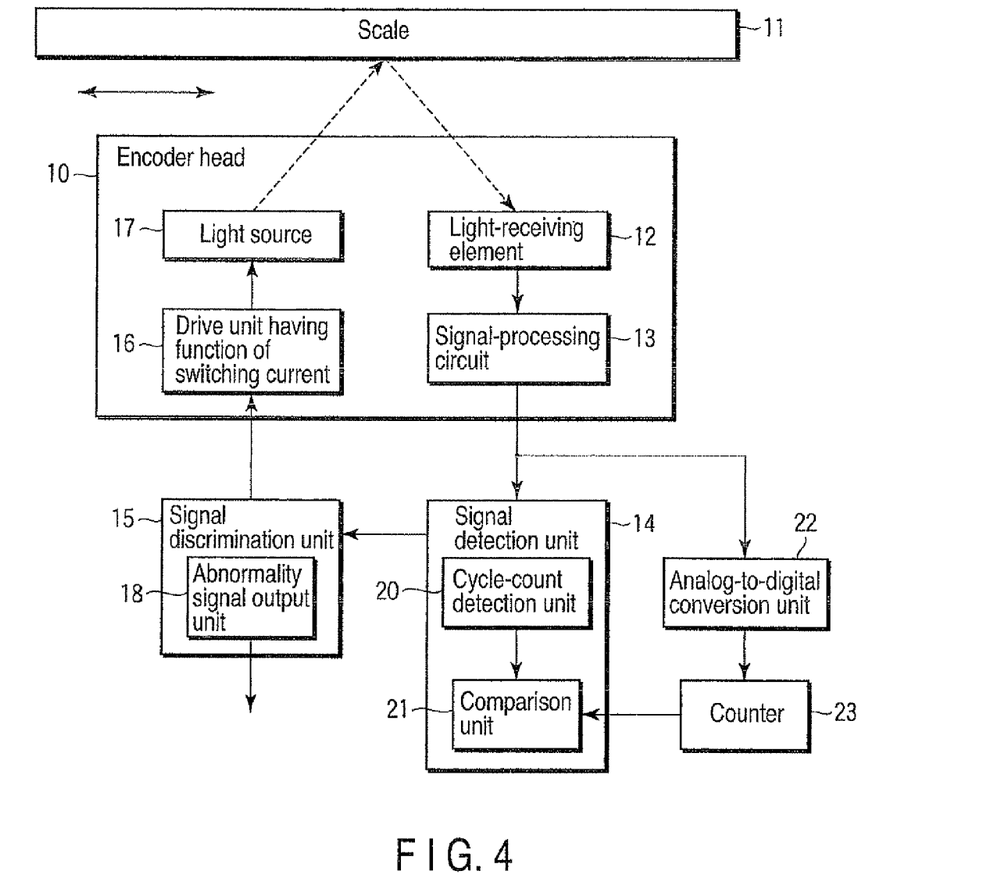
FIG. 4 is a diagram showing a configuration designed to detect an abnormality with an encoder signal.
Figure 5A:
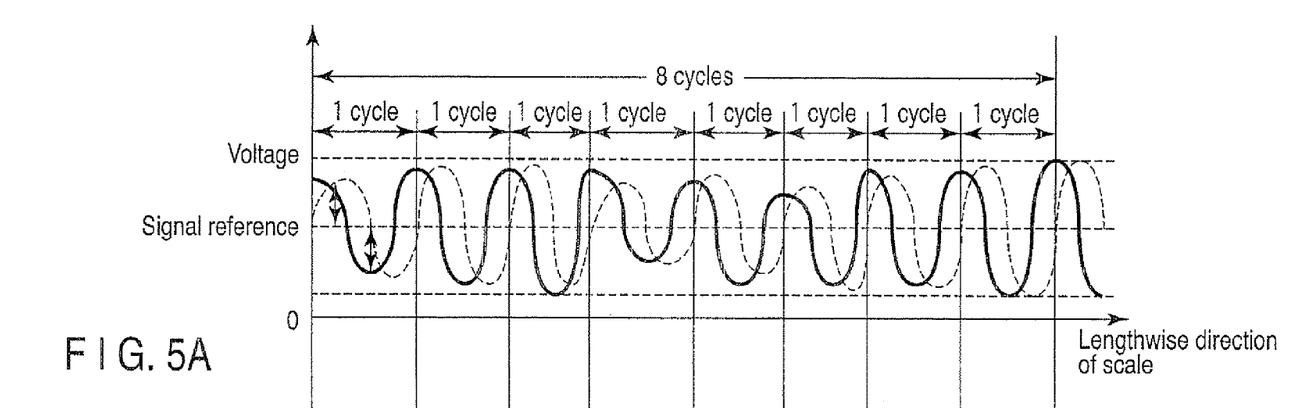
FIGS. 5A and 5B are diagrams explaining the sequence of detecting an abnormality with the encoder signal.

Moreover, the signal discrimination unit 15 can be configured as is illustrated in FIG. 4 in order to detect an abnormality with the encoder signal. In the configuration of FIG. 4, a cycle-count detection unit 20 and a comparison unit 21 are provided in the signal characteristic the signal detection unit 14. The cycle-count detection unit 20 counts the cycles of the encoder signal output from the encoder head 10. The number of cycles, thus counted, is input to the comparison unit 21. At the same time, an analog-to-digital conversion unit 22 digitizes the encoder signal as shown in FIG. 5A. A counter 23 counts the resulting digital signal. The comparison unit 21 compares the count made by the cycle-count detection unit 20 with the count made by the counter 23.

Figure 5B:
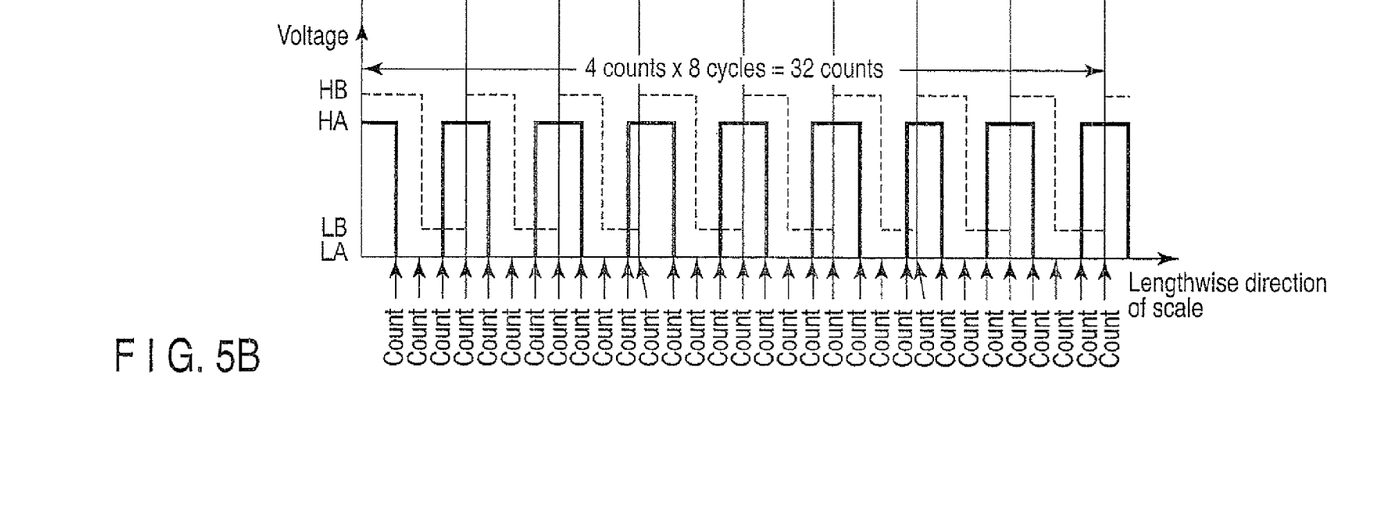

For example, the count for each cycle may be 4. In this case, the count made by the cycle-count detection unit 20 is 4×cycles (8 cycles), or 32 (see FIG. 5B). If the count of 4×cycles is not 32, the signal discrimination unit 15 determines that the encoder signal output from the encoder head 10 cannot be appropriately processed in the apparatus that uses the encoder. In this case, the abnormality signal output unit 18 incorporated in the signal discrimination unit 15 generates an alarm.

The above-mentioned count is based on the assumption that encoder signals, each being a two-phase signal having a phase difference of 90°, are counted. The embodiment is not limited to this. The embodiment can be applied to the case where the divisor is increased through a process such as multiplication.

The alarm can be used to arrange anew the encoder head 10 and the scale 11 at an initial stage of the manufacture of the encoder, or to prevent problems from occurring after the product incorporating the encoder has been put on the market.

The alarm may be output by first setting some or all currents, which can be set, to the drive unit 16 having the function of switching the current, and then repeatedly acquiring the encoder signals output and the characteristic of the encoder signals detected by the signal detection unit 14.

The drive unit 16 has the function of switching the current to be supplied between at least two predetermined magnitudes. The current is switched from one of these predetermined magnitudes to another by means of a switch or the like. Thus, the drive unit 16 has the function of determining the current that should be supplied to the light source 17.

The signal discrimination unit 15 can store in a non-volatile memory the current magnitude to set to the drive unit 16 having the function of switching the current or the mode in which the current is set to the drive unit 16. Once the current magnitude or the mode has been stored, the encoder can be used by supplying such a current to the light source 17 that the encoder may generate an appropriate encoder signal when activated for the next time, even after the supply of power to it has been interrupted.

Configured as described above, the encoder according to this invention can output encoder signals appropriately processed within the specific range of the signal-processing circuit 13, in spite of the aging of the light source 17, the stain or dust on the scale 11 and the efficiency degradation of the light-receiving element 12, etc.

In this invention, the signal detection unit 14 and the signal discrimination unit 15 are arranged outside the encoder head, and only the functions absolutely necessary are provided in the encoder head. The encoder can therefore be very small.

In this embodiment, the head 10 and scale 11 are displaced relative to each other to detect an encoder signal, in an entire region for which at least the encoder signal is utilized and which is a part of the region where the encoder head 10 and scale 11 can undergo relative displacement. Therefore, if the head 10 and scale 11 are displaced relative to each other in the entire region during, for example, the manufacture of the encoder, they may be displaced relative any time thereafter, in a part of the entire region.

which part of the region the head 10 and scale 11 may be displaced next after having been displaced in the entire region depends on the apparatus in which the encoder is used. For example, power may be frequently supplied to the encoder and the positional relationship between the encoder head 10 and the scale 11 may change every time they stop. In this case, the head 10 and scale 11 become as if they were displaced in the entire region during a specific period. If the encoder head 10 and the scale 11 assume the same positional relationship every time they stop, the difference in characteristic between the encoder signal generated when the head 10 and scale 11 almost stop and the encoder signal generated when the head 10 and scale 11 are displaced in the entire region is stored. Then, only the characteristic of the generated when the head 10 and scale 11 almost stop is acquired every time, whereby the characteristic for the entire region can be inferred. Also in other cases, the encoder can output an appropriate encoder signal using the basic construction shown in FIG. 1.

Second Embodiment

Figure 6:
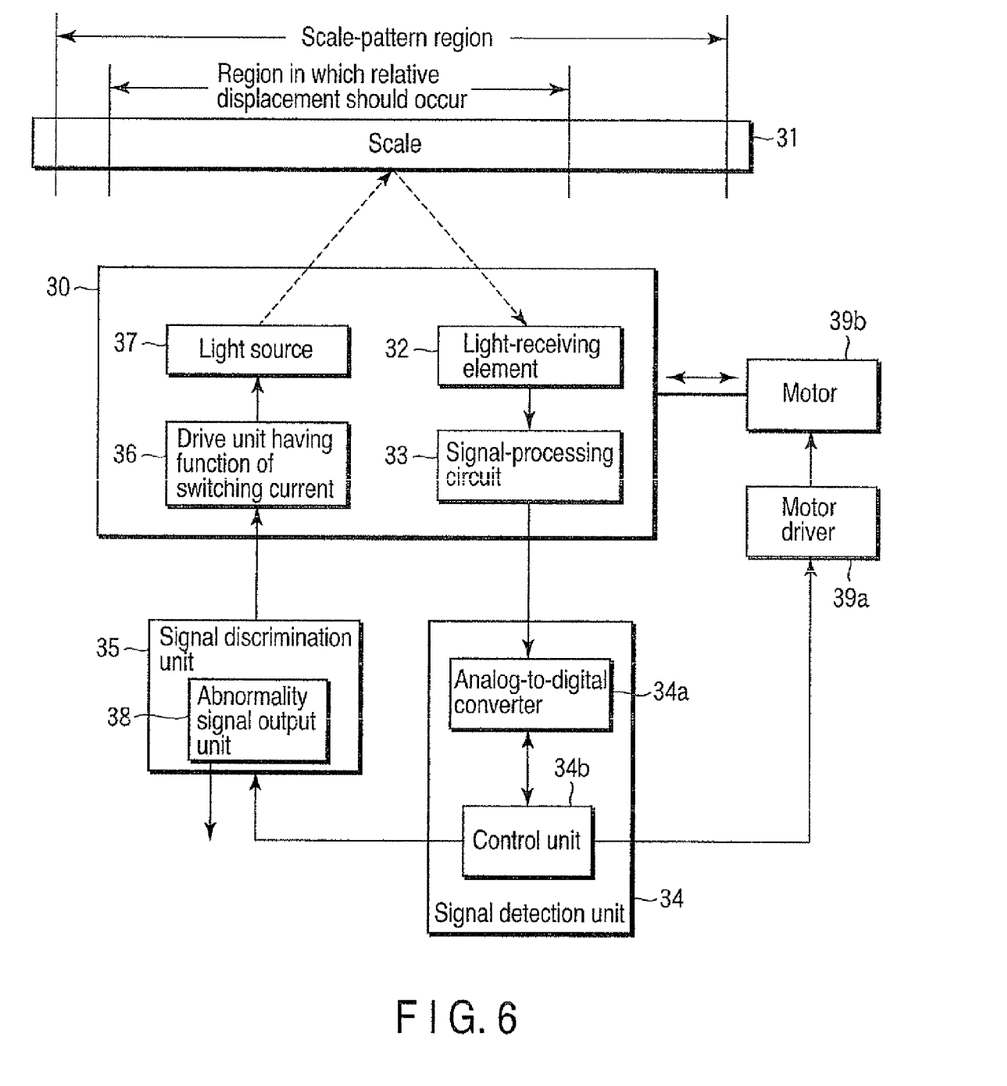
FIG. 6 is a diagram showing the configuration of an encoder according to a second embodiment of this invention.

A second embodiment of this invention will be described. FIG. 6 is a diagram showing the configuration of an encoder according to the second embodiment of this invention. The components identical in terminology to those shown in FIG. 1 will not be described here in detail because their functions have been explained in conjunction with FIG. 1.

A signal detection unit 34 comprises an analog-to-digital converter 34a and a control unit 34b. The analog-to-digital converter 34a digitizes a signal having an almost sinusoidal waveform output from an encoder head 30. The control unit 34b is connected to the analog-to-digital converter 34a and a motor driver 39a that controls a motor 39b for moving an encoder head 30 and a scale 31 relative to each other. The control unit 34b outputs an instruction, instructing the motor driver 39a to move the encoder head 30 and scale 31 relative to each other. Further, the control unit 34b outputs an instruction to the analog-to-digital converter 34a, instructing the analog-to-digital converter 34a to digitize the encoder signal, thereby obtaining a digital value. Such characteristic of the encoder signal, as shown in FIGS. 3A and 3B, is thereby detected.

The instruction the control unit 34b gives the motor driver 39a may instruct that the encoder head 10 and encoder scale 11 should undergo relative displacement at such a speed that the analog-to-digital converter 34a may repeat digitization a number of times, large enough to acquire the characteristic the encoder signal has in each cycle.

The configuration described above can be easily attained if the apparatus incorporating the encoder uses a single-chip microcomputer. That is, the single-chip microcomputer can cause the analog-to-digital converter to digitize the encoder signal, can perform controls by using programs, and can set the output terminal to a specific state. Hence, the signal detection unit 34 and the signal discrimination unit 35 can be formed in a single chip. This can provide an inexpensive encoder that outputs appropriate encoder signals. Having the analog-to-digital converter 34a, the signal detection unit 34 can determine the complex characteristic of the encoder signal more accurately than otherwise.

The detection ranges of the signal detection unit 34 and signal discrimination unit 35 and the detection timings thereof can be the same as in the first embodiment. This embodiment can therefore achieve the same advantages as the first embodiment.

Third Embodiment

Figure 7:
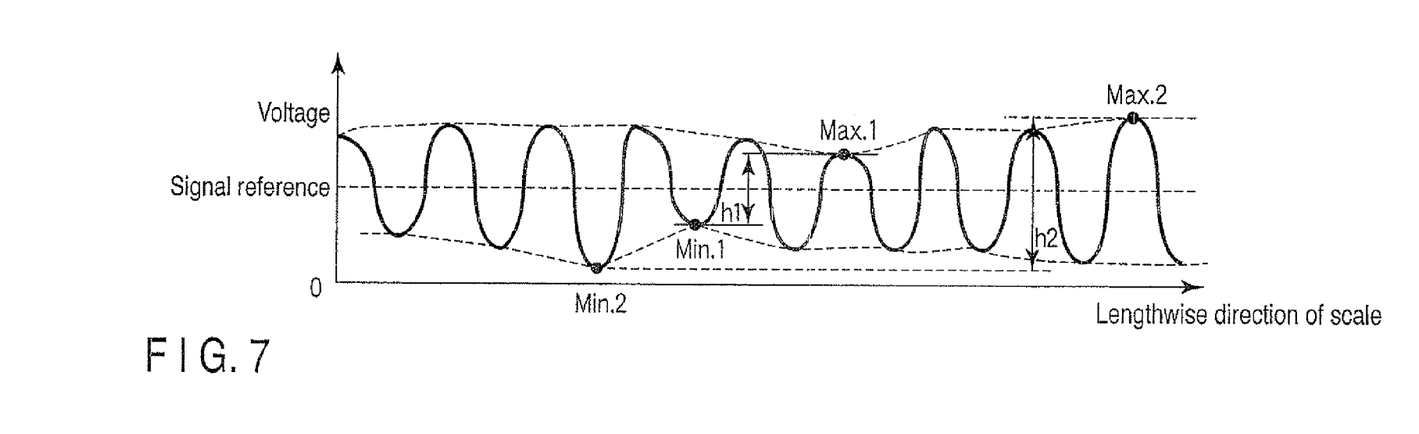
FIG. 7 is a diagram explaining a third embodiment of the present invention.

A third embodiment of this invention will be described with reference to FIG. 7. FIG. 7 shows a modification of the method of detecting the characteristic of the encoder by means of the signal detection unit 14 shown in FIGS. 1 and 4 or by means of the signal detection unit 34 shown in FIG. 6. More precisely, FIG. 7 shows the encoder signal the encoder head 10 or 30 outputs when the head 10 and scale 11 or the head 30 and scale 31 are displaced relative to each other in at least that entire region where they should be so displaced.

The signal detection unit 14 or 34 detects the smallest maximum amplitude Max. 1 and largest minimum amplitude Min. 1 that the signal of having an almost sinusoidal waveform as shown in FIG. 7 has in each cycle when the encoder head 10 or 30 and the encoder scale 11 or 31 are displaced relative to each other in that entire region where they should be so displaced. Similarly, the signal detection unit 14 or 34 detects the largest maximum amplitude Max. 2 and smallest minimum amplitude Min. 2 that the signal of having an almost sinusoidal waveform as shown in FIG. 7 has in each cycle when the encoder head 10 or 30 and the encoder scale 11 or 31 are displaced relative to each other in that entire region where they should be so displaced. From these values detected, h2=Max. 2−Min. 1 and h1=Max. 1−Min. 1 are obtained. Here, h2 indicates the maximum for the range the signal-processing circuit 13 or 33 uses, and h1 indicates the amplitude of the smallest encoder signal that the apparatus using encoder signals must use.

The signal discrimination unit 15 or 35 determines that the signal-processing circuit 13 or 33 has appropriately processed the above-mentioned h2 and that the above-mentioned h1 satisfies the minimum amplitude that the encoder signal must have to be used. Then, the signal discrimination unit 15 or 35 causes the current switching unit 16 or 36 to switch the current that should be supplied to the light source 17 or 37. Note that the minimum amplitude is set on the basis of an error in the digitization, hysteresis at the digitization, noise level in the peripheral circuits, fluctuation due to temperature changes, and margin, all having been estimated. If the encoder signal is used for digitization only, it will suffice to obtain h1 only.

If h2−h1 is greater than a prescribed value, the signal discrimination unit 15 or 35 can generate an alarm showing that the encoder head 10 and encoder scale 11 or the encoder head 30 and encoder scale 31 are not appropriately arranged.

Configured as described above, the embodiment can detect the characteristic of the encoder signal more accurately than otherwise. Ultimately, the encoder can be used in an optimal condition.

The third embodiment may replace a part of the first or second embodiment. In this case, too, the same configuration as described hitherto can be attained, and the same advantages as described above can be achieved.

Fourth Embodiment

Figure 8:
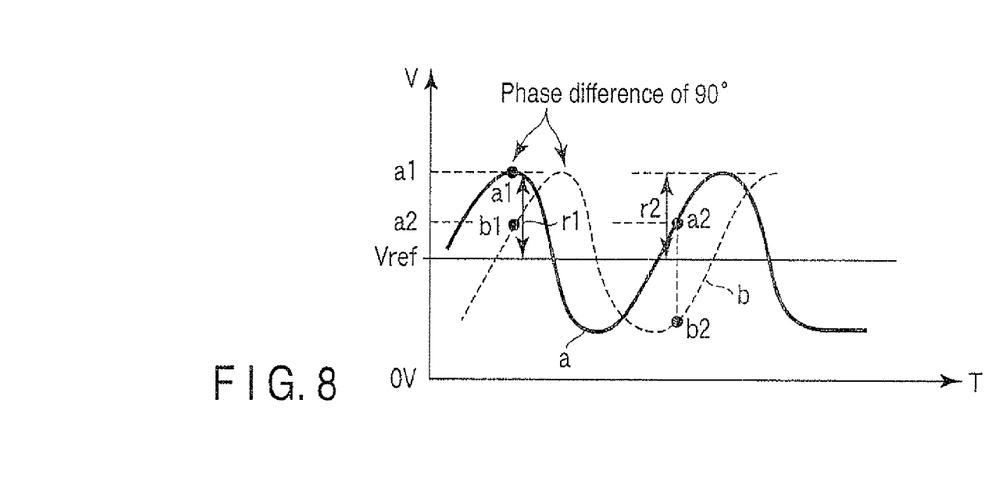
FIG. 8 is a diagram explaining a fourth embodiment of the present invention.

A fourth embodiment of this invention relates to a technique of calculating the amplitudes of a plurality of encoder signals, if any (here, two signals of different phases), by using these encoder signals. For example, such two encoder signals having a sinusoidal waveform and a phase difference of 90° as shown in FIG. 8 may be used. In this case, the amplitude 2×r of either encoder signal is calculated by using the following equation for obtaining the radius r of a circle:

$$r=\sqrt{((a-V\mathrm{ref})^2+(b-V\mathrm{ref})^2)}$$

wherein a and b are the magnitudes of the two encoder signals, respectively, and Vref is the signal reference (center value).

Thus, the amplitude of either encoder signal can be detected no matter whatever positional relationship the encoder head and the scale have in any cycle.

As a result, the amplitude of the encoder signal can be accurately detected even if the encoder signal changes in any cycle in terms of amplitude, even if the head and scale temporarily stop because the head-scale relationship does not pertain to one direction, or even if the moving directions of the head and sale are temporarily reversed because of backlash. In addition, the maximum amplitude and minimum amplitude of either encoder signal can be most accurately detected in the entire region where the encoder head 10 and the scale 11 should undergo relative displacement.

The embodiments described above will be compared with the conventional configuration. Hitherto known is an encoder in which a light-receiving element monitors the luminance of the light source at all times and the current supplied to the light source is automatically adjusted in accordance with the luminance detected. Also known is an encoder in which the encoder signal is monitored at all times and the current supplied to the light source is automatically adjusted so that the encoder signal may have prescribed amplitude.

In the encoder first mentioned, however, the DC component of the encoder signal will increase and the amplitude thereof will decrease though it should not, if the current supplied to the light source is increased when the luminance falls, possibly because of the aging of the light source or the stain or scars on the scale. In the encoder mentioned next, a circuit must be used, which automatically adjusts the current supplied to the light source so that the encoder signal may have constant amplitude. The amplitude of the encoder signal indeed remains constant. If the signal processing circuit operates over its entire range, however, the encode signal may be distorted. Further, having the automatic current adjusting circuit, the encoder is inevitably larger than otherwise. Moreover, the automatic current adjusting circuit will supply a maximum current to the light source if the scale comes off, and some measures must be taken to prevent the supply of the maximum current. Still further, if the light source is of the type that emits light whose luminance is proportional, by a factor greater than one, to the current supplied to it, the temperature range in which it can be used is limited. To stop the supply of the current before the temperature rises to the upper limit of the range, the temperature must be monitored or the light source must be switched from one to another, inevitably increasing the cost. Furthermore, the encoder may receive external light because it is an optical encoder, and the automatic current adjusting circuit may then operate in an unstable state. The user must therefore take some measures against it.

By contrast, an encoder according to this invention can achieve advantages impossible with the conventional configurations described above. The encoder according to the invention can be made small, incorporating an IC in a light-transmitting resin mass, comprising only a light source, a light-receiving element and a light-source drive unit, and a signal processing circuit, which are absolutely necessary to make the encoder to operate. Therefore, the encoder can be made at low cost, can operate at low power-supply voltage, and can yet achieve high resolution.

What is claimed is:

1. An encoder designed to detect a relative displacement between an encoder scale and an encoder head,
   the encoder head incorporating a light source, a light-receiving element configured to receive light from the light source via the encoder scale and a signal-processing unit configured to process an electrical signal output from the light-receiving element,
   the encoder comprising:
   a signal detection unit configured to be activated independently from an operation of the encoder in accordance with setting, and to detect, when activated independently from the operation of the encoder, one or more electrical signals output from the encoder head;
   a signal discrimination unit configured to be activated independently from the operation of the encoder in accordance with setting, and to determine, when activated independently from the operation of the encoder, a waveform of the encoder signal detected by the signal detection unit; and a switching unit configured to switch a current supplied to the light source to one of various magnitudes in accordance with the waveform determined by the signal discrimination unit.

2. The encoder according to claim 1, wherein the signal detection unit detects the encoder signal output when the encoder scale and the encoder head are displaced relative to each other in an entire region as needed, and the signal discrimination unit determines the waveform the encoder signal detected by the signal detection unit.

3. The encoder according to claim 2, wherein the signal detection unit detects the encoder signal output when the encoder scale and the encoder head are displaced relative to each other in a part of the entire region after the encoder scale and the encoder head have undergone relative displacement in the entire region, and the signal discrimination unit determines the waveform the encoder signal detected by the signal detection unit.

4. The encoder according to claim 1, wherein the signal detection unit includes an analog-to-digital converter configured to digitize the encoder signal output from the encoder head and a control unit configured to detect the resulting digital signal.

5. The encoder according to claim 4, wherein the control unit monitors every cycle of the encoder signal output when the encoder scale and the encoder head undergo relative displacement in the entire region as needed, and to detect at least one of the maximum amplitude and minimum amplitude of the encoder signal.

6. The encoder according to claim 4, wherein the control unit comprises at least one of first and second detection units, the first detection unit being configured to detect the smallest maximum amplitude and the largest minimum amplitude the encoder signal has in each cycle, the encoder signal being output when the encoder scale and the encoder head undergo relative displacement in the entire region as needed, and the second detection unit being configured to detect the smallest minimum amplitude and the largest maximum amplitude the encoder signal has in each cycle.

7. The encoder according to claim 4, wherein the control unit calculates the amplitude of the encoder signal from a plurality of encoder signals output when the encoder scale and the encoder head undergo relative displacement in the entire region as needed, by using an equation for obtaining the radius of a circle.

8. The encoder according to claim 1, wherein the second detection unit includes a cycle-count detection unit configured to detect the number of cycles of the encoder signal, and a comparator unit configured to compare the number of cycles detected, with the number of cycles of a digital signal produced by digitizing the encoder signal output from the encoder head.

9. The encoder according to claim 2, wherein the signal discrimination unit has an alarm generating unit configured to generate an alarm indicating an abnormality, when the difference between the maximum amplitude and minimum amplitude that the encoder signal has in each cycle is greater than or equal to a predetermined value, the encoder signal being one detected by the signal detection unit when the encoder scale and the encoder head undergo relative displacement in the entire region as needed.

10. The encoder according to claim 2, wherein the signal detection unit comprises a first detection unit configured to detect the smallest maximum amplitude and the largest minimum amplitude the encoder signal has in each cycle, the encoder signal being one detected by the signal detection unit when the encoder scale and the encoder head undergo relative displacement in the entire region as needed, and a second detection unit configured to detect the largest maximum amplitude and the smallest minimum amplitude the encoder signal has in each cycle; and the signal discrimination unit has an alarm generating unit configured to generate an alarm indicating an abnormality when a difference between first and second differences is greater than or equal to a predetermined value, the first difference being the difference between the smallest and largest amplitudes detected by the first detection unit, and the second difference being the difference between the smallest and largest amplitudes detected by the second detection unit.

11. The encoder according to claim 2, wherein the signal detection unit calculates the amplitude of the encoder signal from a plurality of encoder signals output when the encoder scale and the encoder head undergo relative displacement in the entire region as needed, by using an equation for obtaining the radius of a circle.

12. The encoder according to claim 1, wherein the signal detection unit is configured to be activated when the signal detection unit remains not operated for a specific period.

13. The encoder according to claim 1, wherein the signal discrimination unit is configured to be activated when the signal discrimination unit remains not operated for a specific period.

14. The encoder according to claim 1, wherein the signal detection unit or the signal discrimination unit is configured to be activated when use-environmental condition changes.

* * * * *